United States Patent [19]

Balas, Jr. et al.

[11] 4,074,282
[45] Feb. 14, 1978

[54] RADIATION-SENSITIVE RECORD WITH PROTECTED SENSITIVE SURFACE

[75] Inventors: Charles Balas, Jr., Spring Valley; David Yuan Kong Lou, Ossining, both of N.Y.; George Churchill Kenney, II, Stamford, Conn.

[73] Assignee: North American Philips Corporation, New York, N.Y.

[21] Appl. No.: 687,084

[22] Filed: May 13, 1976

[51] Int. Cl.² ............................................. G01D 15/32
[52] U.S. Cl. .................... 346/135; 346/76 L; 346/137; 346/138; 358/128; 358/297
[58] Field of Search ............... 346/76 L, 135, 137, 346/138; 358/297, 128

[56] References Cited

U.S. PATENT DOCUMENTS

| | | | |
|---|---|---|---|
| 3,665,483 | 5/1972 | Becker | 346/76 L X |
| 4,001,840 | 1/1977 | Becker | 346/76 L |
| 4,038,663 | 7/1977 | Day | 346/137 X |

Primary Examiner—Joseph W. Hartary
Attorney, Agent, or Firm—Frank R. Trifari; Simon L. Cohen

[57] ABSTRACT

A record structure for recording with a radiation beam uses a transparent disc or drum, a coaxial backing disc or drum and two coaxial resilient ring-shaped seals to provide an enclosure between the discs or drums. Radiation-sensitive recording material on the side of the disc or drum within the enclosure is thereby protected from ambient dust particles and other contaminations, while the gaseous or solid by-products of the interaction between the recording material and the radiation beam in the area around which the beam impinges are substantially contained between the disc surfaces and cannot produce deposits on an objective lens used to focus the radiation beam or poison the user.

19 Claims, 10 Drawing Figures

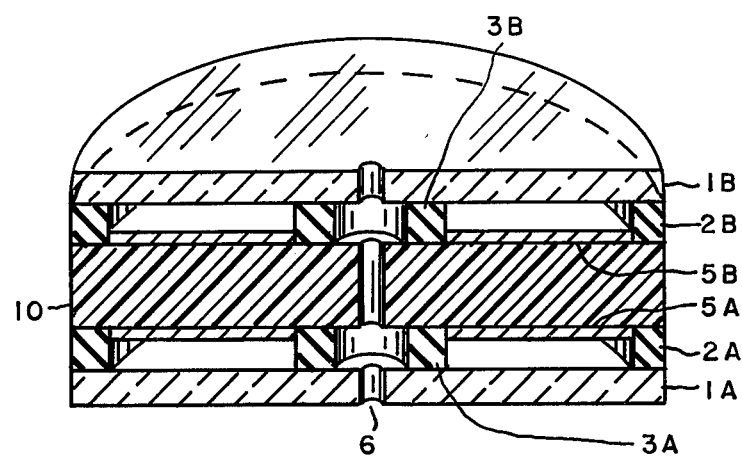
Fig. 5
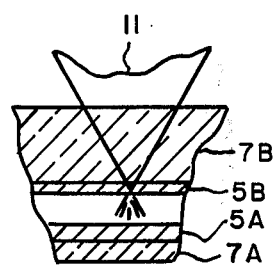 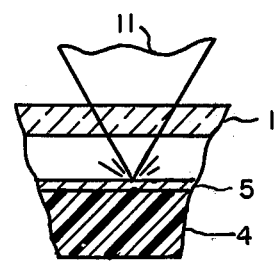
Fig. 6        Fig. 7

RADIATION-SENSITIVE RECORD WITH PROTECTED SENSITIVE SURFACE

BACKGROUND OF THE INVENTION

Radiation beam recording mediums may be generally divided into two types. First, recordings may be made by projecting a radiation beam into a record coated with a photographic layer or a photoresist layer. The image immediately produced in this type of layer is latent, that is, further processing is necessary prior to the time the record may be "played back".

A second type of radiation-sensitive medium provides an immediate change in the optical properties of the recording medium. This latter type of medium is generally referred to as a direct read after write or DRAW material. Examples of such DRAW materials are thin layers of metals such as rhodium or berillium, metal compounds such as arsenic selinide, bismuth compounds, amorphus semiconductors, and photochromic materials such as KCl with $N_aF_a$ centers.

These materials experience a physical change such as melting or evaporation, or a chemical reaction such as decomposition or combination in response to a radiation beam.

The recording process for any of the above types of record mediums involves manufacturing the blank record, recording the information thereon, developing if necessary and encasing the record to protect the same from damage. Between the stages of manufacturing the blank record and encasing the record the radiation-sensitive surface is subject to damage by scratching or nicking due to mishandling. Furthermore, some recording media are subject to chemical contamination prior to recording from handling or from atmospheric pollution.

It is therefore desirable to protect the material in some manner after the blank record is manufactured. An apparently obvious solution would be to coat one side of the transparent disc with radiation-sensitive materials and to coat the sensitive materials with a protective layer. Unfortunately, while the protective layer would prevent scratches and nicks prior to recording, in the case of non-DRAW recording materials the protective layer must be removed prior to development of the sensitive material, while in the case of most DRAW materials, where the recording process generally involves melting and evaporation or chemical reactions producing gaeous by-products, the protective layer would interfere with the physical and chemical processes.

SUMMARY OF THE INVENTION

In order to protect the radiation-sensitive surface of blank DRAW and non-DRAW records according to the invention, the recording medium is enclosed between two members in the form of opposed coaxial discs or drums with two ring-shaped spacers between the discs or drums to maintain a separation between the facing discs or drum surfaces and to seal the enclosure. The radiation-sensitive material is applied to one or both of the discs or drum surfaces prior to assembly. In view of the fact that the records are to be used with a radiation beam focussing objective it is preferable to project the beam through a relatively thin $50\mu$–$200\mu$ member. On the other hand, it is preferable to provide the radiation-sensitive medium on a stable surface. Thus, it is desirable to place the radiation-sensitive layer on a relatively thick surface. In one embodiment of the invention therefor, a reflective DRAW material is applied to a relatively thick $500\mu$–$2000\mu$ surface of substrate while the beam is focused through both a transparent relatively thin $175\mu$ cover disc and through the gas enclosed between the discs.

In the event a two-sided recording disc is desired, two transparent relatively thick discs separated by the resilient ring-shaped members may be provided. In this case, of course, the radiation-sensitive material is applied to both inside surfaces of the two discs and the radiation may be focussed separately through each disc on to the radiation-sensitive material coated thereon. In the two sided configuration, that is, in the last described embodiment wherein the information may be recorded separately on both sides of the record, it may be necessary to place an extremely thin $150\mu$–$175\mu$ disc-shaped separator between the two rigid transparent discs to prevent solid particles or liquid droplets formed as a by-product of recording on one radiation-sensitive surface from affecting a recording previously recorded on the opposite radiation-sensitive surface. This last configuration may be achieved in several different manners. First, the separator may have the same diameter as the transparent relatively thick discs. In this case an additional set of sealing rings will be necessary, one set of sealing rings being placed on each side of the thin separator disc. One set of sealing rings may however be eliminated by attaching the separator disc to the rims of the two sealing rings of a single set of such rings.

One of the problems associated with the above types of two sided blank records is that the recording beam must be focussed through a relatively heavy objective to compensate for the thickness of the discs through which the light passes. In order to avoid this difficulty a further embodiment utilizes a single relatively thick disc having both major surfaces covered with radiation-sensitive material. The radiation-sensitive material is enclosed on each side by a relatively thin transparent disc and a separate pair of sealing rings.

The sealing rings need not form a perfect pneumatic seal, but in some cases it is advantageous to form one or more apertures in the rings to adjust the internal pressures caused by centrifugal forces acting on the gas between the layers when the disc is rotated at high velocities.

BRIEF DESCRIPTION OF THE DRAWINGS

The invention is illustrated by the various embodiments shown in the following drawings, but is not limited thereto:

FIG. 5 is a partial section of a record according to a fourth embodiment of the invention, FIGS. 6 and 7 are portions of sectional views of parts of the record according to the embodiments of FIGS. 2 and 1 showing how a recording is to be made on such record.

FIG. 1 shows a relatively thin 175μ transparent disc 1. A second substantially rigid relatively thick disc 4 is arranged coaxially with the transparent disc 1. Separating the discs 1 and 4 and forming an annular sealed space therebetween is a pair of resilient annular coaxial sealing members 2,3. It is noted that in FIG. 1 as well as in all of the other Figures the relative dimensions of the various members have been intentionally distorted to simplify the drawing. In reality, the diameter to thickness ratios of all of the discs are much larger than that represented in the drawings.

In FIG. 1, a radiation-sensitive layer 5 is provided on the surface of disc 4 that is enclosed within the annular space between the discs 1, 4. The radiation-sensitive layer in this embodiment may be radiation reflecting such as a thin layer of bismuth, arsenic selenide, rhodium, etc., or may be radiation absorbing such as carbon black. In the case of a radiation absorbing sensitive layer the disc 4 is made of a reflecting material such as aluminized plastics. On the other hand where both the disc 4, or at least the inside surface thereof, and the radiation-sensitive layer are reflective, it is advantageous to make the thickness of the layer 5 equal to $n(2N-1)\lambda/4$, where $\lambda$ is the wavelength of the light used to playback the recording, N is a positive integer (1, 2, 3, . . . . . . .) and $n$ is the refractive index of the material.

Figure 1:
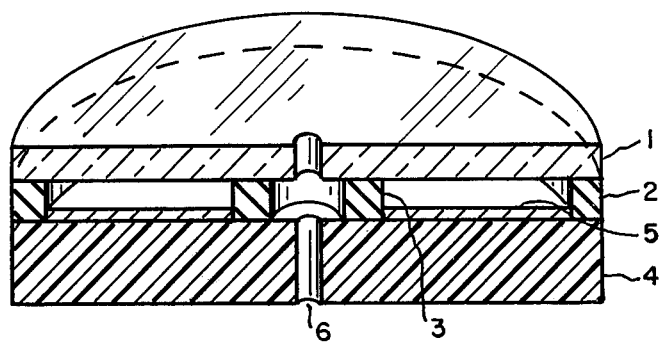
FIG. 1 is a partial section of a recording according to a first embodiment of the invention.

The recording and playback of a disc shown in FIG. 1 will generally be performed as shown in FIG. 7. That is, during recording, a beam of radiation 11 is projected through the disc 1 and the space between the discs onto the radiation-sensitive layer 5. The by-products of the recording process will remain in the space between the discs thereby protecting the objective (not shown) that focusses the radiation beam 11 on the layer 5 and, in the case of recording materials such as arsenic selenide, the utilization of the annular sealed space between the records according to the invention prevents the poisonous by-products of recording from escaping into the atmosphere. The relatively thin disc 1 through which the light is projected furthermore enables the use of a relatively light weight objective, thus facilitating the focussing of the beam 11 onto the layer 5. If the radiation-sensitive material produces a vapor that tends to deposit on the inside surface of the disc 1 restricting the radiation transmission properties thereof, or if the passage of the radiation beam through the two refracting interfaces formed by the inner and outer disc surfaces and the surrounding air makes the location of the focal point of the radiation beam difficult to control, the disc 4 may be made of a transparent material and the recording may be made by focussing the beam through the disc 4 onto the layer 5. A spindle hole 6 through both discs facilitates the placement of the assembly on a turntable.

Figure 2:
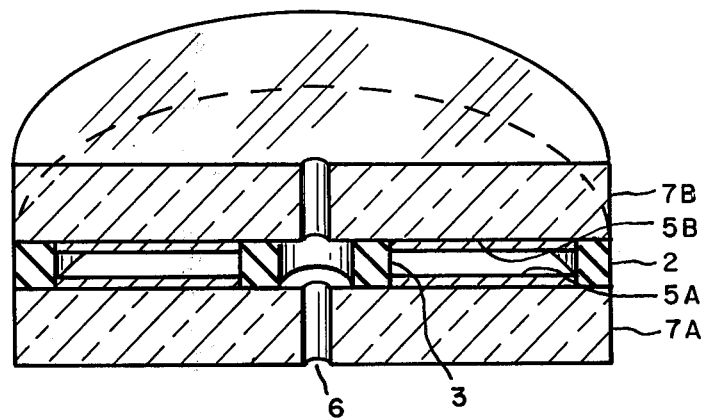
FIG. 2 is a partial section of a recording according to a second embodiment of the invention.

FIG. 2 shows a two sided disc configuration, that is, a disc on which recordings may be independently made on both sides thereof. The resilient sealing members 2, 3 are identical to those of FIG. 1 and will therefore not be described. In FIG. 2 two identical relatively thick transparent discs 7A, 7B are assembled in the same manner as the discs of FIG. 1. A separate layer 5A, 5B of radiation-sensitive material is provided on the inside surfaces of both discs. During recording and playback the radiation beam 11 will be focussed through either disc 7A, 7B on the corresponding radiation-sensitive layer 5A, 5B provided thereon. In this case the radiation-sensitive layers must be made of a reflecting material.

Figure 3:
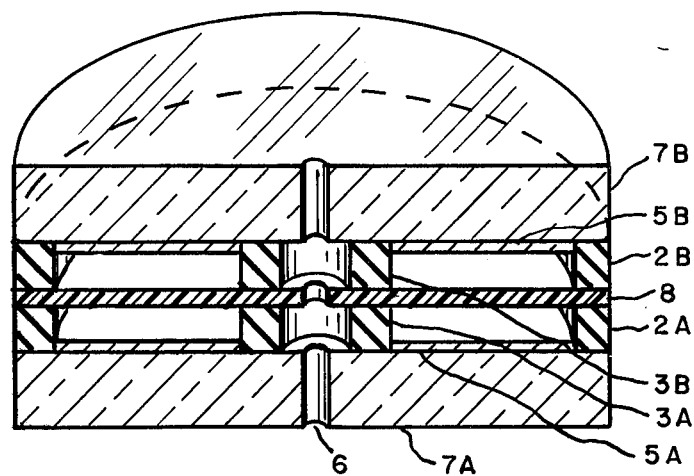
FIG. 3 is a partial section of a record according to a third embodiment of the invention.

Following the recording of a first side of the record of FIG. 2 the nature of the radiation-sensitive layer may be such that the by-products of recording the other side may deposit on and degrade the recording on the first side. This is especially true in the case of a metallic radiation-sensitive layer. To remedy this situation a relatively thin separator disc 8 as shown in FIG. 3 is provided. If the major diameter of the separator disc 8 is the same as the transparent discs 7A, 7B an additional set of resilient sealing rings must be used. Thus, a first set of sealing rings 2A, 3A is provided between the separator disc 8 and transparent disc 7A, forming a first annular space therebetween, while a second set of sealing rings 2B, 3B provides a second annular space between disc 7B and the separator disc 8. As in FIG. 2 the reflective radiation-sensitive material is provided on the inside surfaces of the discs 7A, 7B. Obviously the spindle hole may be continued through the separator disc 8.

Figure 4:
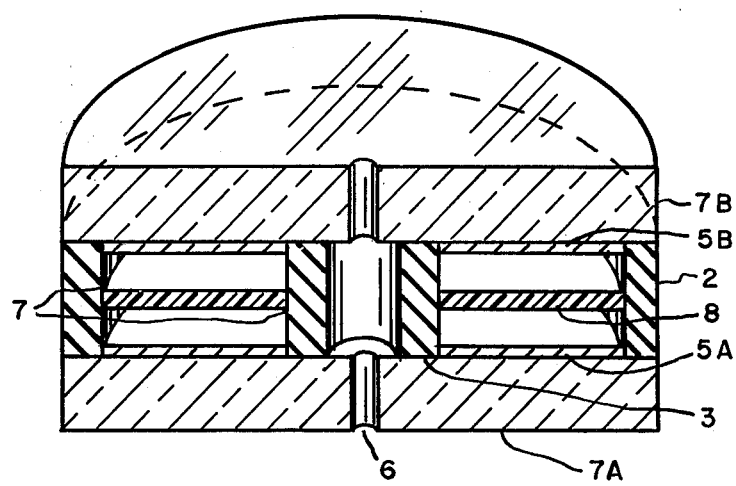
FIG. 4 is a partial section of a modification of the embodiment shown in FIG. 2.

One of the two sets of sealing rings of the record shown in FIG. 3 may be eliminated by using a separator disc 8 that has a smaller diameter than the discs 7A, 7B and by attaching the separator disc 8 to the inner rim of sealing ring 2 and to the outer rim of sealing ring 3 as shown in FIG. 4.

While the two sided record shown in FIGS. 2 through 4 operates satisfactorily it is advantageous, as explained above, to focus the radiation beam 11 through a relatively thin transparent member. FIG. 5 shows a disc configuration wherein a relatively thick disc 10 is coated on both major surfaces with the radiation-sensitive layer 5A, 5B. As in FIG. 3, two sets of sealing rings 2A, 2B, 3A, 3B are utilized in order to form two sealed annular spaces adjacent each radiation-sensitive layer. As with the configuration of FIG. 1 the relatively thick member may be reflective, thus permitting the use of a non-reflective radiation-sensitive layer. In this respect it is noted that where the radiation-sensitive material is non-reflecting and a reflective disc is used to support the material the inter-action between the recording beam and the radiation-sensitive material must be such as to either physically remove the material locally as in the case with carbon black or arsenic selinide, or to change an opaque material into a clear material, or a clear material to an opaque material, as with amorphous semiconductor glasses or photochromics.

As shown in FIGS. 6 and 7 the recording and reproducing beam may be focussed through a transparent disc onto a radiation-sensitive layer provided on the disc or may be focussed through both a transparent disc and a gas layer sealed between the disc and a second disc, onto a radiation-sensitive layer on the second disc.

Figure 8:
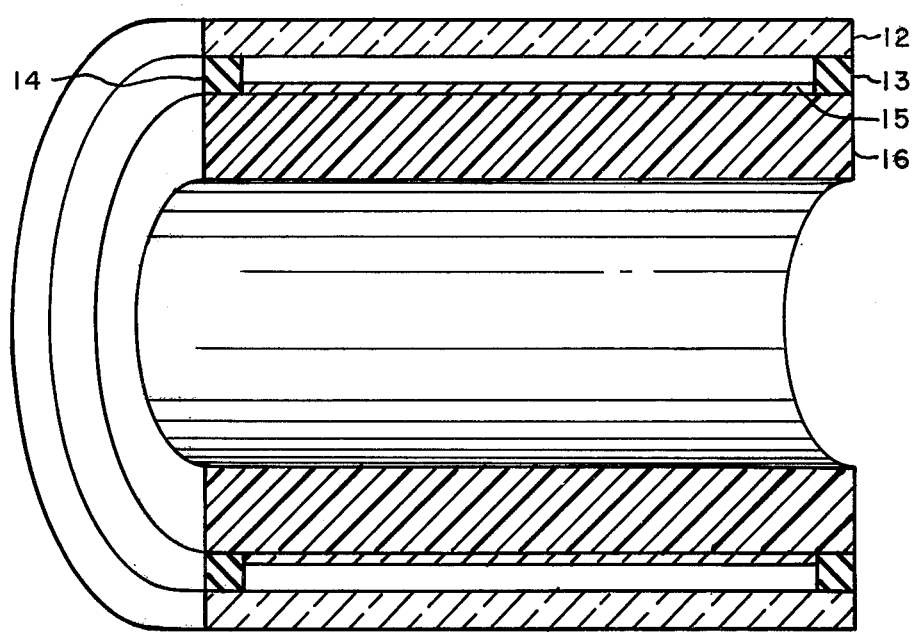
FIG. 8 is a partial section of a record according to a fifth embodiment of the invention.

The same techniques used with manufacturing discs may be applied to cylinders. This is shown in FIG. 8 where a relatively thick cylinder 16 is coated on the outside with a radiation-sensitive material 15. A thinner and larger cylinder 12 surrounds the cylinder 16 coaxially. Between two cylinders at the end thereof are two resilient sealing rings 13, 14 forming a cylindrical sealed space adjacent the radiation-sensitive layer. During recording and reading the cylindrical assembly is rotated on its axis while a beam such as 11 in FIG. 7 is focussed through the transparent material and the gas layer onto the radiation-sensitive material.

In the event that more support is necessary between the various discs of any of the records shown in FIGS.

Figure 9:
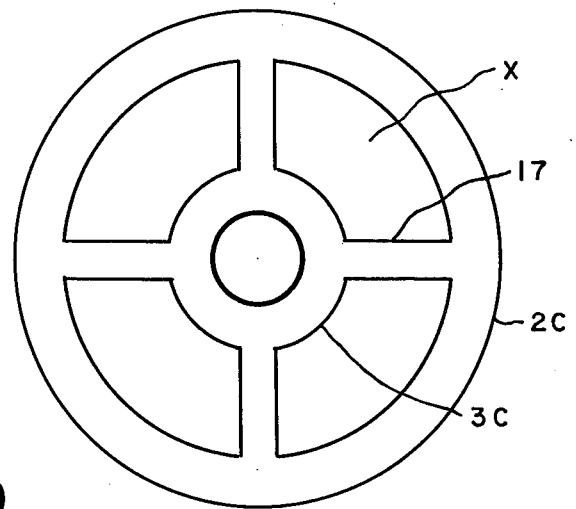
FIG. 9 is a planar view of a modification of the sealing members shown in FIGS. 1 through 5.

1 through 5 the resilient sealing spacer shown in FIG. 9 could be substituted for the different pairs of sealing rings. The sealing member of FIG. 9 consists of two coaxial sealing rings 2C, 3C with four radial sealing spokes 17 connecting the rings. While increasing the strength of the assembly the recording surface is reduced by the area of the spokes.

Figure 10:
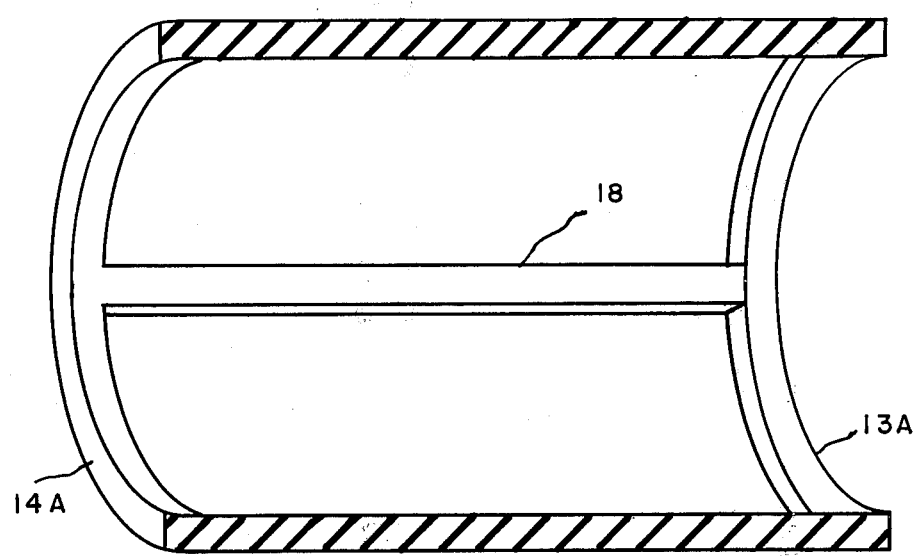
FIG. 10 is a partial sectional view of a modification of the sealing members shown in the embodiment of FIG. 8.

FIG. 10 shows a sealing assembly which may be substituted for the sealing rings of FIG. 8. In a manner analogous with the structure of FIG. 9, four spokes parallel to the axis of the cylinder connect the two outer rings providing additional structural rigidity.

In the case of a DRAW material the sealing rings are permanently connected to the discs or drums by cement or glue at the mating surfaces. A non-DRAW record, however, requires access to the radiation-sensitive material following the recording thereon for the purpose of development and therefor must employ a temporary bond between the discs and the sealing rings using a material such as an adhesive. A recording apparatus utilizing radiation-sensitive discs is known from U.S. Pat. 3,908,080.

What is claimed:

1. A radiation-sensitive record comprising a first disc-shaped member, a second disc-shaped member in coaxial confronted relationship with said first disc-shaped member and spaced therefrom, a pair of coaxial sealing rings of different sizes sealed between the confronting surfaces of said first and second disc-shaped members coaxially therewith and forming an annular space therebetween, at least one of said disc-shaped members being transparent, and a radiation-sensitive recording layer on one of said confronting disc surfaces.

2. A radiation-sensitive record as recited in claim 1, wherein said first disc-shaped member is relatively thick while said second disc-shaped member is relatively thin and wherein said radiation-sensitive recording layer is on the inside surface of said relatively thick member.

3. A radiation-sensitive record as recited in claim 2, wherein said relatively thick disc is said at least one of said disc-shaped members, and wherein said radiation-sensitive layer is a reflective material.

4. A radiation-sensitive record as recited in claim 2, wherein said relatively thick disc-shaped member is made of a reflective material.

5. A radiation-sensitive record as recited in claim 4, wherein said radiation-sensitive recording layer is a reflective material.

6. A radiation-sensitive record as recited in claim 4, wherein said radiation-sensitive recording layer is opaque prior to recording.

7. A radiation-sensitive record as recited in claim 1, wherein both said first and said second disc-shaped members are transparent, and wherein an additional radiation-sensitive layer is provided on the confronting disc surface opposite said one of said confronting disc surfaces.

8. A radiation-sensitive record as recited in claim 7, further comprising a disc-shaped separator means intermediate said two radiation-sensitive layers and coaxial with said disc-shaped members for dividing said annular space into two annular spaces.

9. A radiation-sensitive record as recited in claim 8, wherein said pair of sealing rings is affixed between one major surface of said separator means and said first disc-shaped member, and further comprising an additional pair of sealing rings coaxial with said disc-shaped members and affixed between the other major surface of said separator means and said second disc-shaped member.

10. A radiation-sensitive record as recited in claim 8, wherein said separator means is affixed to a surface of one of said sealing rings closest to the axis thereof and to a surface of the other of said resilient sealing rings furthest from the axis thereof.

11. A radiation-sensitive record as recited in claim 2, further comprising an additional relatively thin disc-shaped member on a side of said relatively thick disc-shaped member opposite said second relatively thin disc-shaped member, an additional pair of resilient sealing rings of different sizes affixed between said relatively thick disc-shaped member and said additional relatively thin disc-shaped member and coaxial therewith forming an additional annular space therebetween, and an additional radiation-sensitive layer on the major surface of said relatively thick disc-shaped member opposite said additional relatively thin disc-shaped member.

12. A radiation-sensitive record as recited in claim 11, wherein said relatively thick disc-shaped member is a reflecting disc.

13. A radiation-sensitive record as recited in claim 12, wherein said radiation-sensitive layers are radiation-absorbing layers prior to recording.

14. A radiation-sensitive record as recited in claim 11, wherein said radiation-sensitive layer is made of a reflecting material.

15. A radiation-sensitive record as recited in claim 12, wherein said radiation-sensitive layer is a reflecting material having a thickness equal to $n(2N\text{-}1)\lambda/4$, where N is a positive integer, $\lambda$ is equal to the wavelength of the radiation to be used for reading the record, and $n$ is the refractive index of the material.

16. A radiation-sensitive record as recited in claim 1, wherein said sealing rings further comprise additional spoke-shaped sealing members having a thickness substantially equal to the thickness of said sealing rings and extending radially between said pair of sealing rings.

17. A radiation-sensitive record comprising a first substantially rigid relatively thick cylindrically-shaped member, a second relatively thin transparent cylindrically-shaped member having an inside diameter larger than the outer diameter of said first cylindrically-shaped member and in coaxial confronting relationship therewith, a pair of coaxial resilient substantially identical sealing rings sealed between the confronting surfaces of said first and second cylindrically-shaped members and forming a cylindrically-shaped space therebetween, and a radiation-sensitive recording layer on the surface of said first cylindrically-shaped member that is in confronting relationship with said second cylindrically-shaped member.

18. A radiation-sensitive record as recited in claim 17, wherein said sealing rings further comprise a plurality of spoke-shaped members having a thickness substantially equal to the thickness of said sealing rings and extending therebetween substantially parallel to the axis of said cylindrically-shaped members.

19. A radiation-sensitive record as recited in claim 1, wherein said first disc-shaped member is relatively thick while the second disc-shaped member is relatively thin and wherein said radiation-sensitive recording layer is on the inside surface of said relatively thin member.

* * * * *